US008940437B2

(12) United States Patent
Green et al.

(10) Patent No.: US 8,940,437 B2
(45) Date of Patent: Jan. 27, 2015

(54) METHOD OF FABRICATING STRUCTURED PARTICLES COMPOSED OF SILICON OR A SILICON-BASED MATERIAL AND THEIR USE IN LITHIUM RECHARGEABLE BATTERIES

(75) Inventors: Mino Green, London (GB); Feng-Ming Liu, Reading (GB)

(73) Assignee: Nexeon Limited, Oxfordshire (GB)

( * ) Notice: Subject to any disclaimer, the term of this patent is extended or adjusted under 35 U.S.C. 154(b) by 0 days.

(21) Appl. No.: 12/669,216

(22) PCT Filed: Jul. 17, 2008

(86) PCT No.: PCT/GB2008/002452
§ 371 (c)(1),
(2), (4) Date: Feb. 26, 2010

(87) PCT Pub. No.: WO2009/010758
PCT Pub. Date: Jan. 22, 2009

(65) Prior Publication Data
US 2010/0178565 A1    Jul. 15, 2010

(30) Foreign Application Priority Data

Jul. 17, 2007    (GB) .................................. 0713898.5

(51) Int. Cl.
*H01M 4/134*        (2010.01)
*H01M 4/04*         (2006.01)
(Continued)

(52) U.S. Cl.
CPC ............ *H01M 4/386* (2013.01); *H01M 4/0492* (2013.01); *H01M 4/134* (2013.01);
(Continued)

(58) Field of Classification Search
CPC .... H01M 4/134; H01M 4/1395; H01M 4/386
USPC ....................... 429/209, 218.1, 231.9, 231.95
See application file for complete search history.

(56) References Cited

U.S. PATENT DOCUMENTS 3,351,445 A    11/1967  Fielder et al.
4,002,541 A    1/1977   Streander
(Continued)

FOREIGN PATENT DOCUMENTS

CN          1821446 A    8/2006
CN        101266919 A    9/2008
(Continued)

OTHER PUBLICATIONS

Yoo, H.; Lee, J.; Kim, H.; Lee, J.; Cho, J.; Park, S., Helical Silicon/Silicon Oxide Core—Shell Anodes Grown onto the Surface of Bulk Silicon, Nano Letters 2011 11 (10), 4324-4328. Publication Date (Web): Sep. 14, 2011. DOI: 10.1021/nl202417c.*
(Continued)

*Primary Examiner* — Jonathan Crepeau
*Assistant Examiner* — Jacob Buchanan
(74) *Attorney, Agent, or Firm* — McDonnell Boehnen Hulbert & Berghoff LLP

(57) ABSTRACT

Pillared particles of silicon or silicon-comprising material and a method of fabricating the same are disclosed. These particles may be used to create both a composite anode structure with a polymer binder, a conductive additive and a metal foil current collector, and an electrode structure. The structure of the particles overcomes the problems of charge/discharge capacity loss.

23 Claims, 4 Drawing Sheets

(51) Int. Cl.
*H01M 4/1395* (2010.01)
*H01M 4/38* (2006.01)
*H01M 10/52* (2006.01)
*C30B 29/62* (2006.01)
*H01M 4/02* (2006.01)

(52) U.S. Cl.
CPC ............ H01M4/1395 (2013.01); H01M 10/52 (2013.01); *H01M 2004/027* (2013.01); *Y02E 60/122* (2013.01)
USPC .................................. 429/218.1; 429/231.9

(56) References Cited

U.S. PATENT DOCUMENTS

| | | |
|---|---|---|
| 4,436,796 A | 3/1984 | Huggins et al. |
| 4,950,566 A | 8/1990 | Huggins et al. |
| 5,260,148 A | 11/1993 | Idota |
| 5,262,021 A | 11/1993 | Lehmann et al. |
| 5,660,948 A | 8/1997 | Barker |
| 5,907,899 A | 6/1999 | Dahn et al. |
| 5,980,722 A | 11/1999 | Kuroda et al. |
| 6,022,640 A | 2/2000 | Takada et al. |
| 6,042,969 A | 3/2000 | Yamada et al. |
| 6,063,995 A | 5/2000 | Bohland et al. |
| 6,235,427 B1 | 5/2001 | Idota et al. |
| 6,296,969 B1 | 10/2001 | Yano et al. |
| 6,334,939 B1 | 1/2002 | Zhou et al. |
| 6,337,156 B1 | 1/2002 | Narang et al. |
| 6,353,317 B1 | 3/2002 | Green et al. |
| 6,399,177 B1 | 6/2002 | Fonash et al. |
| 6,399,246 B1 | 6/2002 | Vandayburg et al. |
| 6,589,696 B2 * | 7/2003 | Matsubara et al. ........ 429/231.8 |
| 6,605,386 B1 | 8/2003 | Kasamatsu et al. |
| 6,620,547 B1 | 9/2003 | Sung et al. |
| 6,624,258 B1 * | 9/2003 | Nikkeshi ...................... 525/408 |
| 6,887,511 B1 | 5/2005 | Shima et al. |
| 6,916,679 B2 | 7/2005 | Snyder et al. |
| 7,033,936 B1 | 4/2006 | Green |
| 7,051,945 B2 | 5/2006 | Empedocles et al. |
| 7,070,632 B1 | 7/2006 | Visco et al. |
| 7,094,499 B1 | 8/2006 | Hung |
| 7,147,894 B2 | 12/2006 | Zhou et al. |
| 7,192,673 B1 | 3/2007 | Ikeda et al. |
| 7,311,999 B2 | 12/2007 | Kawase et al. |
| 7,318,982 B2 | 1/2008 | Gozdz et al. |
| 7,348,102 B2 | 3/2008 | Li et al. |
| 7,358,011 B2 | 4/2008 | Fukuoka et al. |
| 7,378,041 B2 | 5/2008 | Asao et al. |
| 7,425,285 B2 | 9/2008 | Asao et al. |
| 7,476,469 B2 | 1/2009 | Ota et al. |
| 7,569,202 B2 | 8/2009 | Farrell et al. |
| 7,659,034 B2 | 2/2010 | Minami et al. |
| 7,674,552 B2 | 3/2010 | Nakai et al. |
| 7,767,346 B2 | 8/2010 | Kim et al. |
| 7,862,933 B2 | 1/2011 | Okumura et al. |
| 8,034,485 B2 | 10/2011 | Dehn et al. |
| 8,597,831 B2 | 12/2013 | Green et al. |
| 2001/0023986 A1 | 9/2001 | Mancevski |
| 2003/0135989 A1 | 7/2003 | Huggins et al. |
| 2004/0072067 A1 | 4/2004 | Minami et al. |
| 2004/0126659 A1 | 7/2004 | Graetz et al. |
| 2004/0151987 A1 | 8/2004 | Kawase et al. |
| 2004/0166319 A1 | 8/2004 | Li et al. |
| 2004/0185346 A1 | 9/2004 | Takeuchi et al. |
| 2004/0197660 A1 | 10/2004 | Sheem et al. |
| 2004/0214085 A1 | 10/2004 | Sheem et al. |
| 2004/0224231 A1 | 11/2004 | Fujimoto et al. |
| 2004/0241548 A1 | 12/2004 | Nakamoto et al. |
| 2005/0042515 A1 | 2/2005 | Hwang et al. |
| 2005/0079414 A1 | 4/2005 | Yamamoto et al. |
| 2005/0079420 A1 | 4/2005 | Cho et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 * | 9/2005 | Aramata et al. ........... 429/218.1 |
| 2006/0003226 A1 | 1/2006 | Sawa et al. |
| 2006/0004226 A1 | 1/2006 | Machhammer et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0051670 A1 * | 3/2006 | Aramata et al. ........... 429/218.1 |
| 2006/0057463 A1 | 3/2006 | Gao et al. |
| 2006/0088767 A1 | 4/2006 | Li et al. |
| 2006/0097691 A1 * | 5/2006 | Green .......................... 320/107 |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2007/0003835 A1 | 1/2007 | Hasegawa et al. |
| 2007/0026313 A1 | 2/2007 | Sano |
| 2007/0031733 A1 | 2/2007 | Kogetsu et al. |
| 2007/0037063 A1 | 2/2007 | Choi et al. |
| 2007/0048609 A1 | 3/2007 | Yeda et al. |
| 2007/0059598 A1 | 3/2007 | Yang |
| 2007/0065720 A1 | 3/2007 | Hasegawa et al. |
| 2007/0072074 A1 | 3/2007 | Yamamoto et al. |
| 2007/0087268 A1 | 4/2007 | Kim et al. |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0202402 A1 | 8/2007 | Asahina et al. |
| 2007/0207080 A1 | 9/2007 | Yang |
| 2007/0207385 A1 | 9/2007 | Liu et al. |
| 2007/0209584 A1 | 9/2007 | Kalynushkin et al. |
| 2007/0212538 A1 | 9/2007 | Niu |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |

(56) References Cited

U.S. PATENT DOCUMENTS

| | | |
|---|---|---|
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu et al. |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0285358 A1 | 11/2010 | Cui et al. |
| 2010/0297502 A1 | 11/2010 | Zhu et al. |
| 2010/0330419 A1 | 12/2010 | Cui et al. |
| 2011/0000846 A1* | 1/2011 | Ishizuka et al. ............ 210/493.5 |
| 2011/0309306 A1* | 12/2011 | Zhou et al. ................... 252/500 |

FOREIGN PATENT DOCUMENTS

| | | |
|---|---|---|
| CN | 101442124 A | 5/2009 |
| DE | 199 22 257 A1 | 11/2000 |
| DE | 103 47 570 A1 | 5/2005 |
| EP | 0 281 115 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 2 058 882 | 5/2009 |
| EP | 2 204 868 A3 | 7/2010 |
| FR | 2 885 913 B1 | 8/2007 |
| GB | 980513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 6-283156 | 10/1994 |
| JP | 10-046366 | 2/1998 |
| JP | 10-83817 | 3/1998 |
| JP | 10-199524 | 7/1998 |
| JP | 2000-3727 | 1/2000 |
| JP | 2000-173594 | 6/2000 |
| JP | 2000-348730 A | 12/2000 |
| JP | 2001-291514 | 10/2001 |
| JP | 2002-279974 A | 9/2002 |
| JP | 2002-313319 A | 10/2002 |
| JP | 2003-017040 | 1/2003 |
| JP | 2003-168426 | 6/2003 |
| JP | 04-607488 | 2/2004 |
| JP | 2004-71305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-533699 A | 11/2004 |
| JP | 2005-310759 A | 11/2005 |
| JP | 2006-505901 A | 2/2006 |
| JP | 2006-276214 A | 10/2006 |
| JP | 2006-290938 A | 10/2006 |
| JP | 2006-335410 A | 12/2006 |
| JP | 2007080827 A | 3/2007 |
| JP | 2007-165079 A | 6/2007 |
| JP | 2008-034266 | 2/2008 |
| JP | 2008-186732 | 8/2008 |
| JP | 2008210618 A | 9/2008 |
| JP | 2008-234988 | 10/2008 |
| JP | 2008277000 A | 11/2008 |
| JP | 2009523923 A | 6/2009 |
| JP | 2009-252348 A | 10/2009 |
| JP | 2010192444 A | 9/2010 |
| JP | 5000787 B2 | 8/2012 |
| JP | 2013510405 A | 3/2013 |
| KR | 20050090218 A | 9/2005 |
| KR | 2007-023141 | 2/2007 |
| KR | 2007-0110569 A | 11/2007 |
| KR | 2008-038806 A | 5/2008 |
| NL | 1015956 | 8/2000 |
| SU | 471402 | 5/1975 |
| SU | 544019 | 1/1977 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/25356 A2 | 3/2002 |
| WO | WO 02/47185 A2 | 6/2002 |
| WO | WO 03/063271 A1 | 7/2003 |
| WO | WO 03/075372 A2 | 9/2003 |
| WO | WO 2004/042851 A2 | 5/2004 |
| WO | WO 2004/052489 A2 | 6/2004 |
| WO | WO 2004/083490 A2 | 9/2004 |
| WO | WO 2004/109839 A1 | 12/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2006/073427 A2 | 7/2006 |
| WO | WO 2006/120332 A2 | 11/2006 |
| WO | WO 2007/044315 A1 | 4/2007 |
| WO | WO 2007/083152 | 7/2007 |
| WO | WO 2007/083155 | 7/2007 |
| WO | WO 2007/083155 A1 | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 2008/044683 A1 | 4/2008 |
| WO | WO 2008/072460 A1 | 6/2008 |
| WO | WO 2008/097723 A1 | 8/2008 |
| WO | WO 2008/139157 A1 | 11/2008 |
| WO | WO 2009/010757 | 1/2009 |
| WO | WO 2009/010758 | 1/2009 |
| WO | WO 2009/010759 | 1/2009 |
| WO | WO 2009/026466 | 2/2009 |
| WO | WO 2009/120404 A1 | 10/2009 |
| WO | WO 2009/128800 | 10/2009 |
| WO | WO 2010/040985 | 4/2010 |
| WO | WO 2010/040986 | 4/2010 |
| WO | WO 2010/060348 A1 | 6/2010 |
| WO | WO 2010/130975 A1 | 11/2010 |
| WO | WO 2010/130976 A1 | 11/2010 |

OTHER PUBLICATIONS

Cadoret, L.; Reuge, N.; Pannala, S.; Syamlal, M.; Coufort, C.; Caussat, B., Silicon CVD on powders in fluidized bed: Experimental and multifluid Eulerian modelling study, Surface and Coating Technology, vol. 201, Issues 22-23, Sep. 25, 2007, pp. 8919-8923. Available online May 3, 2007 DOI: 10.1016/j.surfcoat.2007.04.119.*

Badel et al., "Formation of Ordered Pore Arrays at the Nanoscale by Electrochemical Etching of N-Type Silicon", Superlattices and Microstructures, 36 (2004) 245-253.

Beaulieu et al., "Colossal Reversible Volume Changes in Lithium Alloys", Electrochemical and Solid-State Letters, 4 (9) (2001) A137-A140.

Beaulieu et al., "Reaction of Li with Grain-Boundary Atoms in Nanostructured Compounds", Journal of the Electrochemical Society, 147 (9) (2000) 3206-3212.

(56) References Cited

OTHER PUBLICATIONS

Besenhard et al., "Will Advanced Lithium-Alloy Anodes Have a Chance in Lithium-Ion Batteries?", Journal of Power Sources, 68 (1997) 87-90.
Boukamp et al., "All-Solid Lithium Electrodes with Mixed-Conductor Matrix", J. Electrochem. Soc.: Electrochemical Science and Technology, vol. 128, No. 4, (1981) 725-729.
Bourderau, et al., "Amorphous Silicon as a Possible Anode Material for Li-Ion Batteries", Journal of Power Sources, 81-82 (1999) 233-236.
Colinge, Jean-Pierre, "Silicon-on-Insulator Technology: Materials to VLSI", Chapter 2, SOI Materials, (1991), Cover page and p. 38.
Deal et al., "General Relationship for the Thermal Oxidation of Silicon", Journal of Applied Physics, vol. 36, No. 12, (Dec. 1965) 3770-3778.
Feng et al., "Lithography-Free Silicon Micro-Pillars as Catalyst Supports for Microfabricated Fuel Cell Applications", Electrochemistry Communications, 8 (2006) 1235-1238.
Green et al., "Quantum Pillar Structures on n+ Gallium Arsenide Fabricated Using "Natural" Lithography", Appl. Phys. Lett., 62 (3) (1993) 264-266.
Green et al., "Structured Silicon Anodes for Lithium Battery Applications", Electrochemical and Solid-State Letters, 6 (5) (2003) A75-A79.
Green et al., "Mesoscopic Hemisphere Arrays for use as Resist in Solid State Structure Fabrication", J. Vac. Sci. Technol. B 17(5) (1999) 2074-2083.
Yan et al., "Growth of Amorphous Silicon Nanowires via a Solid-Liquid-Solid Mechanism", Chemical Physics Letters, 323 (2000) 224-228.
Shin et al., "Porous Silicon Negative Electrodes for Rechargeable Lithium Batteries", Journal of Power Sources, 139 (2005) 314-320.
Li et al., "A High Capacity Nano-Si Composite Anode Material for Lithium Rechargeable Batteries", Electrochemical and Solid-State Letters, 2 (11) (1999) 547-549.
Li et al., "The Crystal Structural Evolution of Nano-Si Anode Caused by Lithium Insertion and Extraction at Room Temperature", Solid State Ionics, 135 (2000) 181-191.
Huggins, Robert A., "Lithium Alloy Anodes" in Handbook of Battery Materials, J.O. Besenhard Ed., Wiley-VCH, Weinheim, 361-381 (1999).
Chang et al., "Ultrafast Growth of Single-Crystalline Si Nanowires", Materials Letters, 60 (2006) 2125-2128.
Kim et al., "Improvement of Silicon Powder Negative Electrodes by Copper Electroless Deposition for Lithium Secondary Batteries", Journal of Power Sources, 147 (2005) 227-233.
Jianfeng et al., "Large-Scale Array of Highly Oriented Silicon-Rich Micro/Nanowires Induced by Gas Flow Steering", Solid State Communications, 133 (2005) 271-275.
Lu et al., "A Study of the Mechanisms of Erosion in Silicon Single Crystals Using Hertzian Fracture Tests", Wear, 186-187 (1995) 105-116.
Kleimann et al., "Formation of Wide and Deep Pores in Silicon by Electrochemical Etching", Materials Science and Engineering, B69-70 (2000) 29-33.
Kolasinski, Kurt W., "Silicon Nanostructures from Electroless Electrochemical Etching", Current Opinion in Solid State and Materials Science, 9 (2005) 73-83.
Pei et al., "Silicon Nanowires Grown from Silicon Monoxide Under Hydrothermal Conditions", Journal of Crystal Growth, 289 (2006) 423-427.
Chen et al., "Selective Etching of Silicon in Aqueous Ammonia Solution", Sensors and Actuators, A 49 (1995) 115-121.
Maranchi et al., "Interfacial Properties of the a-Si/Cu:Active-Inactive Thin-Film Anode Systems for Lithium-Ion Batteries", Journal of the Electrochemical Society: 153 (6) (2006) A1246-A1253.
Nakahata et al., "Fabrication of Lotus-Type Porous Silicon by Unidirectional Solidification in Hyrdogen", Materials Science and Engineering A 384 (2004) 373-376.
Niparko, J.K. (Editor), "Cochlear Implant Technology", Pub., Lippincott Williams and Wilkins, Philadelphia, (2000) 108-121.
Ohara et al., "A Thin Film Silicon Anode for Li-Ion Batteries Having a Very Large Specific Capacity and Long Cycle Life", Journal of Power Sources, 136 (2004) 303-306.
Peng et al., "Dendrite-Assisted Growth of Silicon Nanowires in Electroless Metal Deposition", Adv. Funct. Mater., 13, No. 2 (2003) 127-132.
Peng et al., "Synthesis of Large-Area Silicon Nanowire Arrays via Self-Assembling Nanoelectrochemistry", Adv. Mater., 14, No. 16 (2002) 1164-1167.
Peng et al., "Uniform, Axial-Orientation Alignment of One-Dimensional Single-Crystal Silicon Nanostructure Arrays", Angew. Chem. Ind. Ed., 44 (2005) 2737-2742.
Peng et al., "Simultaneous Gold Deposition and Formation of Silicon Nanowire Arrays", Journal of Electroanalytical Chemistry, 558 (2003) 35-39.
Canham, L. T., "Diffusion of Li IN Si", Properties of Silicon, EMIS Datareviews Series No. 4 (1987) 454-462.
Qiu et al., "Self-Assembled Growth and Optical Emission of Silver-Capped Silicon Nanowires", Applied Physics Letters, vol. 84, No. 19, (2004) 3867-3869.
Kim et al., "(110) Silicon Etching for High Aspect Ratio Comb Structures", 1997 6th International Conference on Emerging Technologies and Factory Automation Proceedings, (1997) 248-252.
Sharma et al., "Thermodynamic Properties of the Lithium—Silicon System", J. Electrochem. Soc.: Electrochemical Science and Technology, vol. 123 (1976) 1763-1768.
Qiu et al., "From S1 Nanotubes to Nanowires: Synthesis, Characterization, and Self-Assembly", Journal of Crystal Growth, 277 (2005) 143-148.
Tokoro et al., "Anisotropic Etching Properties of Silicon in KOH and TMAH Solutions", Proceedings of the 1998 International Symposium on Micromechatronics and Human Science (1998) 65-70.
Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.
Wagner et al., "Vapor-Liquid-Solid Mechanism of Single Crystal Growth", Applied Physics Letters, vol. 4, No. 5 (1964) 89-90.
Lang, Walter, "Silicon Microstructuring Technology", Materials Science and Engineering, R17 (1996) 1-55.
Liu et al., "Effect of Electrode Structure on Performance of Si Anode in Li-Ion Batteries: Si Particle Size and Conductive Additive", Journal of Power Source, 140 (2005) 139-144.
Yan et al., "$H_2$-Assisted Control Growth of Si Nanowires", Journal of Crystal Growth, 257 (2003) 69-74.
Liu et al., "A Novel Method of Fabricating Porous Silicon Material: Ultrasonically Enhanced Anodic Electrochemical Etching", Solid State Communications, 127 (2003) 583-588.
Zhang et al., "Bulk-Quantity Si Nanowires Synthesized by SiO Sublimation", Journal of Crystal Growth, 212 (2000) 115-118.
Wong et al., "Controlled Growth of Silicon Nanowires Synthesized Via Solid-Liquid-Solid Mechanism", Science and Technology of Advanced Materials, 6 (2005) 330-334.
Zhang et al., "Synthesis of Thin Si Whiskers (Nanowires) Using $SiCl_4$", Journal of Crystal Growth, 2006 (2001) 185-191.
Yoshio et al., "Electrochemical Behaviors of Silicon Based Anode Material", Journal of Power Sources, 153 (2006) 375-379.
Zhang et al., "Catalytic Growth of x-$FiSi_2$ and Silicon Nanowires", Journal of Crystal Growth, 280 (2005) 286-291.
Winter, et al., "Insertion Electrode Materials for Rechargeable Lithium Batteries", Advanced Materials, 1998, 10, No. 10.
Kasavajjula et al., "Nano- and Bulk-Silicon-Based Insertion Anodes for Lithium-Ion Secondary Cells", Journal of Power Sources, 163 (2007) 1003-1039.
Peng, et al., "Fabrication of Single-Crystalline Silicon Nanowires by Scratching a Silicon Surface with Catalytic Metal Particles", Adv. Funct. Mater., 16 (2006), 387-394.
Barraclough et al., "Cold Compaction of Silicon Powders Without a Binding Agent", Materials Letters 61 (2007) 485-487.
International Search Report for PCT/GB2008/002452 dated Jan. 13, 2009.
Written Opinion of the International Searching Authority dated Jan. 13, 2009.

(56) References Cited

OTHER PUBLICATIONS

De Angelis et al., "Water Soluble Nanoporous Nanoparticles for in Vivo Targeted Drug Deliver and Controlled Release in B Cells Tumor Context", Nanoscale, 1020, vol. 2, p. 2230-2236.

Garrido, et al., The Role of Chemical Species in the Passivation of <100> Silicon Surfaces by HF in Water-Ethanol Solutions, J. Electrochem Soc., vol. 143, No. 12, 1996, p. 4059-4066.

Russo, et al., "A Mechanical Approach to Porous Silicon Nanoparticles Fabrication", Materials 2011, vol. 4, p. 1023-1033.

Takami et al., "Silicon Fiber Formed on Silicon Without Using a Gas Process", Journal of Applied Physics, vol. 91, No. 12, 2-5 (2002).

Ye et al., Controllable Growth of Silver Nanostructures by a Simple Replacement Reaction and Their SERS Studies, Solid State Sciences 11 (2009), p. 1088-1093.

Chan et al., "Surface Chemistry and Morphology of the Solid Electrolyte Interphase on Silicon Nanowire Lithium-Ion Battery Anodes", Journal of Power Sources, 189(2), 1132-1140, (2009).

Chen et al., Binder Effect on Cycling Performance of Silicon/Carbon Composite Anodes for Lithium Ion Batteries, 36 (2006) 1099-1104.

Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).

Chevrier et al., "Methods for Successful Cycling of Alloy Negative Electrodes in Li-Ion Cells", $220^{th}$ ECS Meeting, Abstract #1237 (2011).

Choi et al., "Effect of Fluoroethylene Carbonate Additive on Interfacial Properties of Silicon Thin-Film Electrode", Journal of Power Sources, 161(2), 1254-1259 (2006).

El Ouatani et al., "The Effect of Vinylene Carbonate Additive on Surface Film Formation on Both Electrodes in Li-Ion Batteries", J. Electrochem. Soc., 156(2), A103-A113 (2009).

Han et al., "Neutralized Poly (Acrylic Acid) as Polymer Binder for High Capacity Silicon Negative Electrodes", $220^{th}$ ECS Meeting, Abstract #1250 (2011).

Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).

Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.

Komba et al., "Functional Interface of Polymer Modified Graphite Anode", Journal of Power Sources, 189, (2009), 197-203.

Komba et al., "Polyacrylate as Functional Binder for Silicon and Grapite Composite Electrode in Lithium-Ion Batteries", Electrochemistry, 79(1), (2011), 6-9.

Komba et al., "Polyacrylate Modifier for Graphite Anode of Lithium-Ion Batteries", Electrochemical and Solid-State Letters, 12(5), (2009), A107-A110.

Komba et al., "Study on Polymer Binders for High-Capacity SiO Negative Electrode of Li-Ion Batteries", Journal of Physical Chemistry, 115, (2011), 13487-13495.

Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.

Li et al., "Sodium Carboxymethyl Cellulose: A Potential Binder for Si Negative Electrodes for Li-Ion Batteries". Electrochemical and Solid-State Letters, 10(2) (2007), A17-A20.

Liu et al., "Enhanced Cycle Life of Si Anode for Li-Ion Batteries by Using Modified Elastomeric Binder", Electrochemical and Solid-State Letters, 8(2) (2005), A100-A103.

Obrovac et al., "Structural Changes in Silicon Anodes During Lithium Insertion/Extraction", Electrochemical and Solid-State Letters, 7(5), (2004), A96-A96.

Sugama, et al., "Nature of Interfacial Interaction Mechanisms Between Polyacrylic Acid Macromolecules and Oxide Metal Surfaces", Journal of Materials Science, 19 (1984) 4045-4056.

Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.

Wen et al., "Chemical Diffusion in Intermediate Phases in the Lithium—Silicon System", Journal of Solid State Chemistry, 37 (1981) 271-278.

Weydanz et al., "A Room Temperature Study of the Binary Lithium—Silicon and the Ternary Lithium—Chromium—Silicon System for use in Rechargeable Lithium Batteries", Journal of Power Sources, 81-82 (1999) 237-242.

Yabuuchi et al., "Graphite-Silicon-Polyacrylate Negative Electrodes inIonic Liquid Electrolyte for Safer Rechargeable Li-Ion Batteries", Advanced Energy Materials, 1, (2011), 759-765.

Zhang et al., "A Review on Electrolyte Additives for Lithium-Ion Batteries", Journal of Power Sources, 162(2), 1379-1394, (2006).

European Search Report Corresponding to EP 10 002797 dated Jun. 7, 2010.

Ivanovskaya et al., "The Effect of Treatment of Cation-Selective Glass Electrodes With AgNO3 Solution on Electrode Properties", Sensors and Actuators B 24-25 (1995) 304-308.

Peng et al., "Fabrication of Large-Area Silicon Nanowire p-n Junction Diode Arrays", Adv. Mater. (2004), vol. 16, No. 1, 73-76.

Peng et al., "Silicon Nanowires for Rechargeable Lithium-ion Battery Anodes", Applied Physics Letters (2008) vol. 93, No. 3, pp. 33105-1 to 33105-3.

Peng, K. et al., "Metal-Particle-Induced, Highly Localized Site-Specific Etching of Si and Formation of Single-Crystalline Si Nanowires in Aqueous Fluoride Solution", Chemistry A European Journal 2006, 12, pp. 7942-7947 (2006).

http://www.keytometals.com/page.aspx?ID=CheckArticle&LN=EN&site=KTN&NM=80, Aluminum—Silicon Alloys: Key to Metals Article, 3 pages, Oct. 26, 2011.

* cited by examiner

METHOD OF FABRICATING STRUCTURED PARTICLES COMPOSED OF SILICON OR A SILICON-BASED MATERIAL AND THEIR USE IN LITHIUM RECHARGEABLE BATTERIES

The invention relates to a particle comprising silicon, a method of fabricating a particle, an electrode containing particles as its active material, an electrochemical cell, a lithium rechargeable cell anode, a cell, a device powered by a cell, a method of creating a composite electrode, a method of fabricating a lithium rechargeable cell and a method of fabricating silicon-comprising fibres.

The recent increase in the use of portable electronic devices such as mobile telephones and notebook computers and the emerging trend of using rechargeable batteries in hybrid electric vehicles has created a need for smaller, lighter, longer lasting rechargeable batteries to provide the power to the above mentioned and other battery powered devices. During the 1990s, lithium rechargeable batteries, specifically lithium-ion batteries, became popular and, in terms of units sold, now dominate the portable electronics marketplace and are set to be applied to new, cost sensitive applications. However, as more and more power hungry functions are added to the above mentioned devices (e.g. cameras on mobile phones), improved and lower cost batteries that store more energy per unit mass and per unit volume are required.

It is well known that silicon can be used as the active anode material of a rechargeable lithium-ion electrochemical battery cell (see, for example, Insertion Electrode Materials for Rechargeable Lithium Batteries, M. Winter, J. O. Besenhard, M. E. Spahr, and P. Novak in Adv. Mater. 1998, 10, No. 10). The basic composition of a conventional lithium-ion rechargeable battery cell is shown in FIG. 1 including a graphite-based anode electrode, the component to be replaced by the silicon-based anode. The battery cell includes a single cell but may also include more than one cell.

The battery cell generally comprises a copper current collector 10 for the anode and an aluminium current collector 12 for the cathode which are externally connectable to a load or to a recharging source as appropriate. A graphite-based composite anode layer 14 overlays the current collector 10 and a lithium containing metal oxide-based composite cathode layer 16 overlays the current collector 12. A porous plastic spacer or separator 20 is provided between the graphite-based composite anode layer 14 and the lithium containing metal oxide-based composite cathode layer 16 and a liquid electrolyte material is dispersed within the porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16.

When the battery cell is fully charged, lithium has been transported from the lithium containing metal oxide via the electrolyte into the graphite-based layer where it reacts with the graphite to create the compound, $LiC_6$. The graphite, being the electrochemically active material in the composite anode layer, has a maximum capacity of 372 mAh/g. It will be noted that the terms "anode" and "cathode" are used in the sense that the battery is placed across a load.

It is generally believed that silicon, when used as an active anode material in a lithium-ion rechargeable cell, provides a significantly higher capacity than the currently used graphite. Silicon, when converted to the compound $Li_{21}Si_5$ by reaction with lithium in an electrochemical cell, has a maximum capacity of 4,200 mAh/g, considerably higher than the maximum capacity for graphite. Thus, if graphite can be replaced by silicon in a lithium rechargeable battery the desired increase in stored energy per unit mass and per unit volume can be achieved.

Existing approaches of using a silicon or silicon-based active anode material in a lithium-ion electrochemical cell have failed to show sustained capacity over the required number of charge/discharge cycles and are thus not commercially viable.

One approach disclosed in the art uses silicon in the form of a powder (say as particles or spherical elements with a 10 μm diameter), in some instances made into a composite with or without an electronic additive and containing an appropriate binder such as polyvinylidene difluoride coated onto a copper current collector. However, this electrode system fails to show sustained capacity when subjected to repeated charge/discharge cycles. It is believed that this capacity loss is due to partial mechanical isolation of the silicon powder mass arising from the volumetric expansion/contraction associated with lithium insertion/extraction to and from the host silicon. In turn this gives rise to electrical isolation of the silicon elements from both the copper current collector and themselves. In addition, the volumetric expansion/contraction causes the spherical elements to be broken up causing a loss of electrical contact within the spherical element itself.

Another approach known in the art designed to deal with the problem of the large volume changes during successive cycles is to make the size of the silicon elements that make up the silicon powder very small, that is to use spherical particles that have diameters in the 1-10 nm range. This strategy assumes that the nano-sized elements can undergo the large volumetric expansion/contraction associated with lithium insertion/extraction without being broken up or destroyed. However, this approach is problematic in that it requires the handling of very fine, nano-sized powder that may pose a health and safety risk and it does not prevent the electrical isolation of the spherical elements from both the copper current collector and themselves as the silicon powder undergoes the volumetric expansion/contraction associated with lithium insertion/extraction. Importantly, the large surface area of the nano-sized elements can give rise to the creation of a lithium-containing surface film that introduces a large irreversible capacity into the lithium-ion battery cell. In addition, the large number of small silicon particles creates a large number of particle-to-particle contacts for a given mass of silicon and these each have a contact resistance and may thus cause the electrical resistance of the silicon mass to be too high. The above problems have thus prevented silicon particles from becoming a commercially viable replacement for graphite in lithium rechargeable batteries and specifically lithium-ion batteries.

In another approach described by Ohara et al. in Journal of Power Sources 136 (2004) 303-306 silicon is evaporated onto a nickel foil current collector as a thin film and this structure is then used to fowl the anode of a lithium-ion cell. However, although this approach gives good capacity retention, this is only the case for very thin films (say ~50 nm) and thus these electrode structures do not give usable amounts of capacity per unit area. Increasing the film thickness (say >250 nm) causes the good capacity retention to be eliminated. The good capacity retention of these thin films is considered by the present inventors to be due to the ability of the thin film to absorb the volumetric expansion/contraction associated with lithium insertion/extraction from the host silicon without the film being broken up or destroyed. Also, the thin film has a much lower surface area than the equivalent mass of nano-sized particles and thus the amount of irreversible capacity due to the formation of a lithium-containing surface film is reduced. The above problems have thus prevented a thin film of silicon on a metal foil current collector from becoming a commercially viable replacement for graphite in lithium rechargeable batteries and specifically lithium-ion batteries.

In another approach described in US2004/0126659, silicon is evaporated onto nickel fibres which are then used to form the anode of a lithium battery.

However this is found to provide an uneven distribution of silicon on the nickel fibres hence significantly affecting operation. In addition, these structures have a high ratio of nickel current collector mass to active silicon mass and thus do not give usable amounts of capacity per unit area or per unit mass.

A review of nano- and bulk-silicon-based insertion anodes for lithium-ion secondary cells has been provided by Kasavajjula et al (J. Power Sources (2006), doi:10.1016/jpowsour.2006.09.84), herewith incorporated by reference herein.

Another approach described in UK Patent Application GB2395059A uses an silicon electrode comprising a regular or irregular array of silicon pillars fabricated on a silicon substrate. These structured silicon electrodes show good capacity retention when subjected to repeated charge/discharge cycles and this good capacity retention is considered by the present inventors to be due to the ability of the silicon pillars to absorb the volumetric expansion/contraction associated with lithium insertion/extraction from the host silicon without the pillars being broken up or destroyed. However, the structured silicon electrodes described in the above publication is fabricated by using a high purity, single crystal silicon wafer and hence produces an electrode with a potentially high cost.

The first aspect of the invention provides a particle comprising silicon having a particle core and an array of silicon-comprising pillars extending therefrom.

The pillars may be regular or irregular. The pillars of the present invention are 0.08 to 0.70 microns in one dimension, preferably 0.1 to 0.5 microns, more preferably 0.2 to 0.4 microns, and most preferably 0.3 microns or above. In a second dimension, the pillars are 4 to 100 microns, preferably 10 to 80 microns, more preferably 30 microns or above. The pillars thus have an aspect ratio of greater than 20:1. The pillars may have a substantially circular cross-section or a substantially non-circular cross-section.

The pillared particle may comprise undoped silicon, doped silicon or a mixture, such as a silicon-germanium mixture. In particular, the particle may have a silicon-purity of 90.00% to 99.95% by mass, preferably 90.0% to 99.5%. The silicon can be doped with any material for example, phosphorous, aluminium, silver, boron and/or zinc. The particle may be relatively low purity metallurgical grade silicon.

The particles may be regular or irregular in cross section and can be from 10 μm to 1 mm in diameter, preferably 20 μm to 150 μm, more preferably 25 μm to 75 μm.

The second aspect of the invention provides a method of fabricating a particle of the first aspect, comprising the steps of etching a particle comprising silicon. In particular, the pillars can be created by chemical reaction etching or galvanic exchange etching.

The third aspect of the invention provides a composite electrode containing particles as defined in the first aspect of the invention as one of its active materials. In particular, the third aspect provides a composite electrode which uses copper as a current collector. In a feature of the third aspect, the electrode can be an anode.

The third aspect therefore further provides an electrochemical cell containing an electrode as defined above. In particular, there is provided an electrochemical cell in which the cathode comprises a lithium-containing compound capable of releasing and reabsorbing lithium ions as its active material. In particular, there is provided an electrochemical cell in which the cathode comprises lithium-based metal oxide or phosphate as its active material preferably $LiCoO_2$ or $LiMn_xNi_xCo_{1-2x}O_2$ or $LiFePO_4$.

The invention further provides a lithium rechargeable cell anode comprising particles of the first aspect. In particular, there is provided an anode in which the particles are part of a composite.

The third aspect further provides a cell comprising an anode and a cathode wherein the cathode preferably comprises lithium-based material, more preferably lithium cobalt dioxide.

There is further provided a device powered by a cell as defined above.

The fourth aspect of the invention provides a method of creating a composite electrode comprising the steps of preparing a solvent-based slurry containing pillared particles, coating the slurry onto a current collector and evaporating the solvent to create a composite film.

The invention further provides a method of fabricating a lithium rechargeable cell comprising the steps of creating an anode as defined above and adding a cathode an electrolyte. In particular, the method further comprising adding a separator between cathode and the anode. A casing may be provided around the cell.

There is also provided a method of fabricating silicon-comprising fibres in which the pillars are detached from a particle of the first aspect by one or more of scraping, agitating or chemical etching.

The production of an anode electrode structure using the structured particles of the invention further overcomes the problems of reversibly reacting silicon with lithium. In particular by arranging the particles in a composite structure, that is a mixture of particles, a polymer binder and an conductive additive, or by directing bonding the structured particles to the current collector, the charge/discharge process becomes reversible and repeatable and good capacity retention is achieved. This good reversibility is considered by the present inventors to be due to the ability of the silicon pillars forming part of the structured silicon particle to absorb the volumetric expansion/contraction associated with lithium insertion/extraction from the host silicon without the pillars being broken up or destroyed. Importantly, the silicon electrodes described in this invention are fabricated by using a low purity, metallurgical grade silicon and hence produces an electrode with a potentially low cost.

Embodiments of the invention will now be described, by way of example, with reference to the figures, of which:

In overview the invention allows creation of pillared particles of silicon or silicon-comprising material and the use of these particles to create both a composite anode structure with a polymer binder, an conductive additive (if required) and a metal foil current collector and an electrode structure. In particular it is believed that the structure of the particles that make up the composite overcomes the problem of charge/discharge capacity loss. By providing a particle with a plurality of elongate or long thin pillars the problem of charge/discharge capacity loss is reduced.

Typically the pillars will have a length to diameter ratio of approximately 20:1. The insertion and removal of lithium into the pillars, although causing volume expansion and volume contraction, does not cause the pillars to be destroyed and hence the intra-fibre electronic conductivity is preserved.

The pillars can be made on the particles by wet etching/using a chemical galvanic exchange method for example as described in our co-pending application GB 0601318.9 with common assignees and entitled "Method of etching a silicon-based material", incorporated herewith by reference. A related method which may also be used has been disclosed in Peng K-Q, Yan, Y-J Gao, S-P, Zhu J., Adv. Materials, 14 (2004), 1164-1167 ("Peng"); K. Peng et al, Angew. Chem. Int. Ed., 44 2737-2742; and K. Peng et al., Adv. Funct. Mater., 16 (2006), 387-394; K. Peng, Z. Huang and J. Zhu, Adv. Mater., 16 (2004), 127-132; and T. Qui, L. Wu, X. Yang, G. S. Huang and Z. Y. Zhang, Appl. Phys. Lett., 84 (2004), 3867-3869. The above-mentioned methods are used to produce pillars from a high purity silicon wafer.

Figure 2:
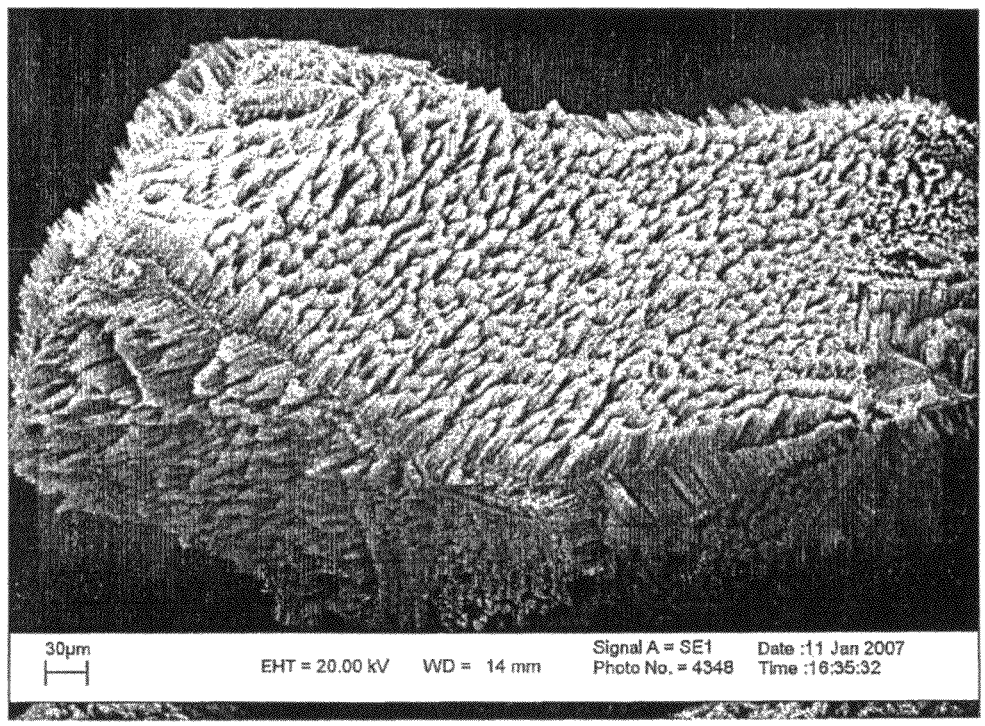
FIG. 2 is a electron micrograph of a pillared particle according to embodiments of the present invention.

In a preferred embodiment of the present invention, pillars are produced on crystalline particles of relatively low purity silicon such as metallurgical grade silicon. The method comprises the five steps of: grinding and sieving; washing; nucleation; etching; and silver removal, as explained, by way of example only, later. An electron micrograph of pillared particle made in accordance with present invention is shown in FIG. 2.

Any appropriate grinding process is suitable such as power grinding or ball milling. The skilled person will appreciate that a minimum particle size will exist below which pillars cannot be etched onto the surface and instead the particle will be homogeneously etched away. Particles having a diameter less than 0.5 μm may be too small.

A more uniform pillar array, in terms of density and height, is produced by nucleating before etching. This step produces a uniform distribution of silver nuclei/islands (nuclei combine and form silver islands that are the site for pillar growth).

Figure 3:
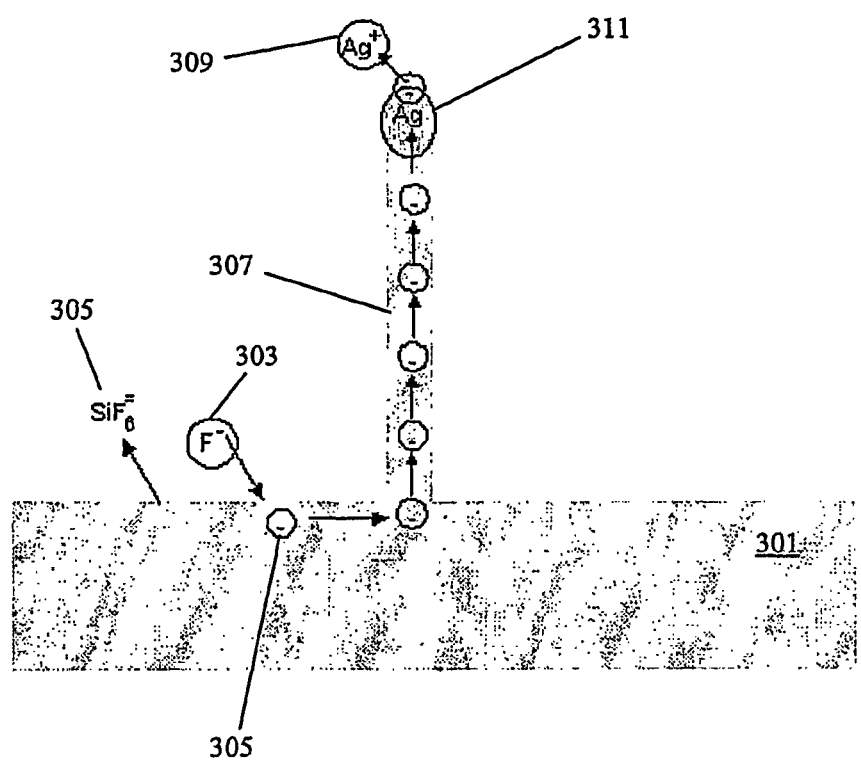
FIG. 3 shows the overall galvanic exchange etching mechanism.

Silver islands delineate the formation of pillars and galvanic fluoride etching of the {100} planes: see FIG. 3. Referring to FIG. 3 there is shown a silicon surface 301 having a pillar 307. An electron 305 is transferred from a fluoride ion 303 to the silicon surface 301. The reaction of fluorine with silicon 301 and fluoride ions 303 gives rise to fluorosilicate ions 305. This is the anodic etching process. The cathode process is the discharge of silver ions 309 to produce metallic silver 311.

The structure is explained by supposing that silicon—fluoride bonds are formed as an essential step in the etch process. And furthermore that structures that are Si—F (mono-fluoride) are stable and those that are F—Si—F (di-fluoride) and Si[—F]3 (tri-fluoride) are not stable. This is because of steric interference on the Si surface of nearest neighbour groups. The case of the {111} plane is that, a mono-fluoride surface, stable except at the edges, inevitably proceeds to a tri-fluoride surface and consequent instability. The {110} surface is the only stable major crystal plane of Si that will have exclusively mono-fluoride bonds-hence its stability and the etch rate ratio [etch rate <100>]:[etch rate <110>] of about three orders of magnitude. So the sides of the pillars will be terminated on {110} planes.

A pillar surface density may be used to define the density of the pillars on the surface of the particle. Herein, this is defined as $F=P/[R+P]$ wherein: F is the pillar surface density; P is the total surface area of the particle occupied by pillars; and R is the total surface area of the particle unoccupied by pillars.

The larger the pillar surface density, the larger the lithium capacity per unit area of a silicon particle electrode and the larger the amount of harvestable pillars available to create fibres.

For example, using the above-mentioned silicon powder from Elken of Norway having a pre-etching size of 400×300×200 μm, pillars are produced all over the surface having a pillar height of approximately 25 to 30 μm, a diameter of approximately 200 to 500 nm and a pillar surface density, F, of 10-50%, more typically, 30%.

For example, particles having a pre-etching size of approximately 63-80×50×35 μm are found to produce pillars with a height of approximately 10 to 15 μm, with a coverage of approximately 30% and a diameter of approximately 200 to 500 nm In a preferred embodiment, pillars of for example 100 microns in length and 0.2 microns in diameter are fabricated on and from a silicon-comprising particle. More generally pillars of length in the range of 4 to 100 microns and diameter or transverse dimension in the range of 0.08 to 0.70 microns are fabricated from a particle having an initial size of 10 to 1000 μm.

According to the process, the silicon particles may be predominantly n- or p-type and, according to the chemical approach, and may be etched on any exposed (100), (111) or (110) crystal face. Since the etching proceeds along crystal planes, the resulting pillars are single crystals. Because of this structural feature, the pillars will be substantially straight facilitating length to diameter ratio of greater than 20:1.

The pillared-particles may then be used to form a composite electrode as described later. Alternatively, the pillars may be detached from the particle and used to form a fibre-based electrode. The detached pillars may also be described as fibres.

The invention encompasses the detachment of the pillars from the particle. The particle, with pillars attached, can be placed in a beaker or any appropriate container, covered in an inert liquid such as ethanol or water and subjected to ultrasonic agitation. It is found that within several minutes the liquid is seen to be turbid and it can be seen by electron microscope examination that at this stage the pillars have been removed from the particle.

In an embodiment, the pillars are removed from the particle in a two stage process. In the first stage, the particles are washed several times in water and, if necessary, dried in a low vacuum system to remove the water. In the second stage, the particles are agitated in an ultrasonic bath to detach the pillars. These are suspended in water and then filtered using different various filter paper sizes to collect the silicon fibres.

It will be appreciated that alternative methods for "harvesting" the pillars include scraping the particle surface to detach them or detaching them chemically. One chemical approach appropriate to n-type silicon material comprises etching the particle in an HF solution in the presence of backside illumination.

Once the pillared particles have been fabricated they can be used as the active material in a composite anode for lithium-ion electrochemical cells. To fabricate a composite anode, the pillared particles are mixed with polyvinylidene difluoride and made into a slurry with a casting solvent such as n-methylpyrrolidinone. This slurry can then be applied or coated onto a metal plate or metal foil or other conducting substrate for example physically with a blade or in any other appropriate manner to yield a coated film of the required thickness and the casting solvent is then evaporated from this film using an appropriate drying system which may employ elevated temperatures in the range of 50 degrees C. to 140 degrees C. to leave the composite film free or substantially from casting solvent. The resulting composite film has a porous structure in which the mass of silicon-based pillared particles is typically between 70 percent and 95 percent. The composite film will have a percentage pore volume of 10-30 percent, preferably about 20 percent.

Figure 1:
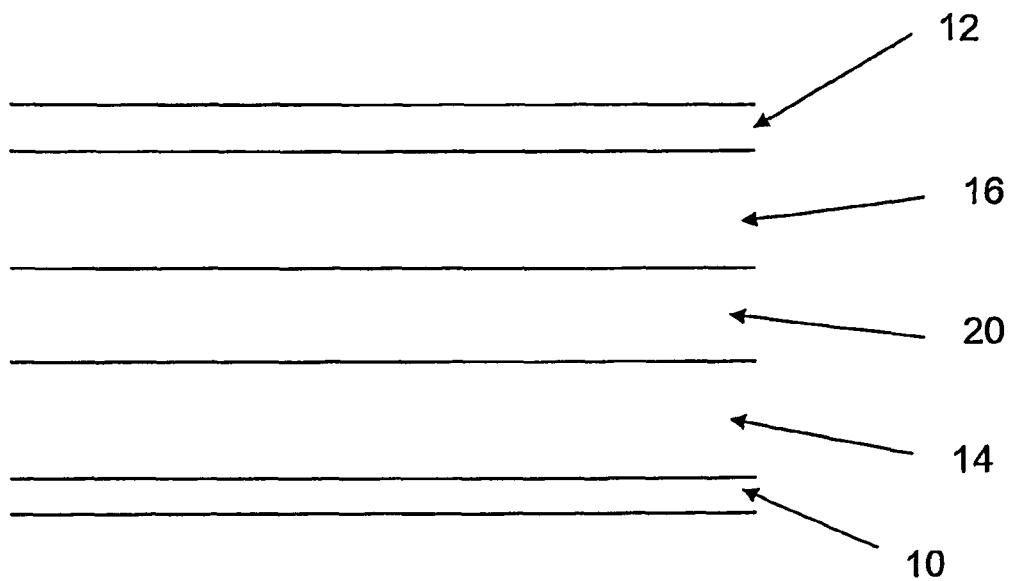
FIG. 1 is a schematic diagram showing the components of a battery cell.

Fabrication of the lithium-ion battery cell thereafter can be carried out in any appropriate manner for example following the general structure shown in FIG. 1 but with a silicon-comprising active anode material rather than a graphite active anode material. For example the silicon particle-based composite anode layer is covered by the porous spacer 20, the electrolyte added to the final structure saturating all the available pore volume. The electrolyte addition is done after placing the electrodes in an appropriate casing and may include vacuum filling of the anode to ensure the pore volume is filled with the liquid electrolyte.

Some embodiments provide an electrode containing as its active material a plurality of pillared particles of silicon. Capacity retention is improved as the pillared structure of the silicon allows for accommodation of the volume expansion associated with insertion/extraction (charging and discharging) of lithium. Advantageously, the pillared particles may be created by etching lumps of low purity, silicon (termed metallurgical grade silicon) such that a core of silicon remains covered by pillars that are between 0.08 µm and 0.5 µm in diameter and between 4 µm and 150 µm in length.

A particular advantage of the approach described herein is that large sheets of silicon-based anode can be fabricated and then rolled or stamped out subsequently as is currently the case in graphite-based anodes for lithium-ion battery cells meaning that the approach described herein can be retrofitted with the existing manufacturing capability.

The invention will now be illustrated by reference to one or more of the following non-limiting examples:

Grinding and Seiving

In the first stage, widely-available metallurgical grade silicon, such as "Silgrain" from Elkem of Norway, was ground and sieved to produce particles in the range 10 to 1000 µm, preferably 30 to 300 µm and more preferably 50 to 100 µm.

Washing

The second stage comprised washing the ground and sieved particles in water to remove any fine particles stuck to the big particles. The washed particles were then treated in diluted $HNO_3$ (1 mol·L) or $H_2SO_4/H_2O_2$ (1:2 in volume) or $H_2O_2/NH_3H_2O/H_2O_2$ (1:1:1 in volume) in 10 minutes to get rid of the possible organic or metal impurities.

Nucleation

In the third stage, a nucleation reaction was carried out in a solution of 17.5 ml HF (40%)+20 ml $AgNO_3$ (0.06 mol/l)+2.5 ml EtOH (97.5%)+10 ml $H_2O$ for 7~10 minutes at room temperature (~23° C.) using 0.1 g of silicon particles with the dimension of about 400×300×200 µm. For the same weight of silicon, smaller silicon particles required a larger solution volume due to the increased surface area to volume ratio.

The effect of ethanol at room temperature was to slow the chemical processes which gives a more uniform distribution of silver islands. The time (especially at the upper limit) was sufficient to consume a significant amount of the solution silver.

Etching

The fourth stage comprised etching. The etching reaction used a solution of 17.5 ml HF (40%)+12.5 ml $Fe(NO_3)_3$ (0.06 mol·l)+2 ml $AgNO_3$ (0.06 mol·l)+18 ml $H_2O$ for 1~1.5 hours at room temperature (~23° C.) using 0.1 g of silicon particles with the dimension of about 400×300×200 µm. For the same weight of silicon, smaller silicon particles required a larger solution volume due to the increased surface area to volume ratio. In addition, as the particle size deceases, a shorter time is needed for smaller silicon particles, for example, 30 min for 100~120 µm (sieve size) sample and 20 min for 63~80 µm sample.

In further modifications, stirring increased the etch rate possibly owing to the discharge of hydrogen. Here, the out diffusion of fluorosilicate ion was rate limiting.

The skilled person will understand that oxidizing agents other than $Ag^+$ may be equally suitable. For example: $K_2PtCl_6$; $Cu(NO_3)_2$; $Ni(NO_3)_2$; $Mn(NO_3)_2$; $Fe(NO_3)_3$; $Co(NO_3)_2$; $Cr(NO_3)_3$; $Mg(NO_3)_2$. Compounds involving Cu and Pt, having potentials higher than hydrogen, give metal deposition (Cu and Pt) but the others, except for Ni, do not.

Figure 4:
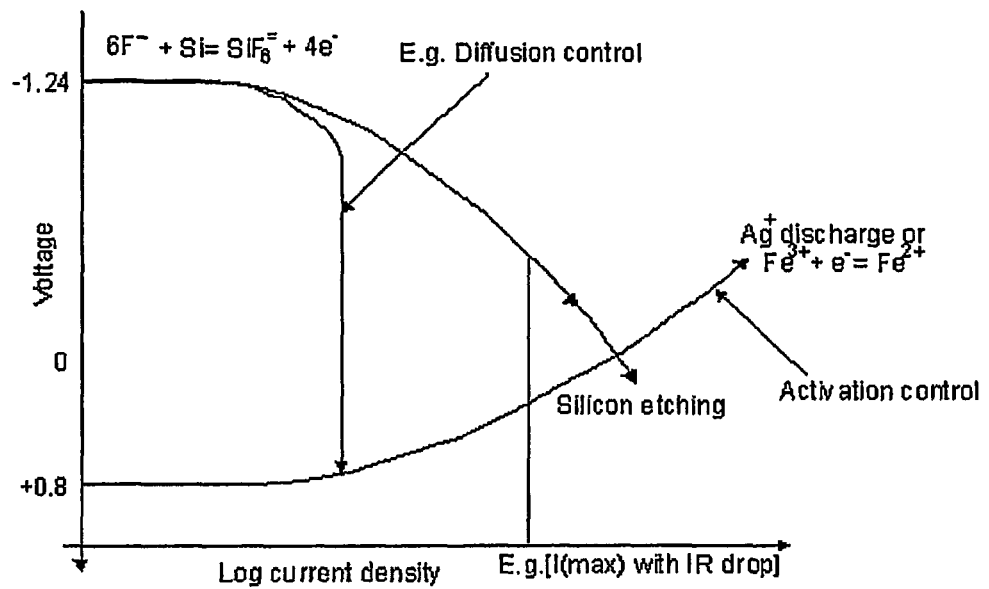
FIG. 4 shows hypothetical kinetic curves in the form of the partial currents in the galvanic exchange etching process.

The overall galvanic exchange etching mechanism can be illustrated using FIGS. 3 and 4. In FIG. 3 the anodic process,

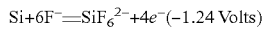

is the local etching of silicon. While the removal of the electrons accompanied by the discharge of silver ions is the cathodic process

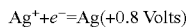

For standard conditions the overall cell voltage is 2.04 volts. The other cathodic couples of interest are $Cu/Cu^{2+}$ (+0.35V); $PtCl_6^{2-}/PtCl_4^{2-}$ (+0.74V); $Fe^{3+}/Fe^{2+}$ (+0.77V), since they are all positive with respect to hydrogen. Couples that are more negative than $H^+/H_2$ will be in competition with hydrogen and will be largely ineffective. FIG. 4 shows a schematic version of the partial electrode reactions.

Silver Removal

The final stage of the process involved removing the silver which was left on the etched silicon particles from the third and fourth stages. The silver was removed (and saved) using a solution of 15% $HNO_3$ for 5~10 min.

It will be appreciated, of course, that any appropriate approach can be adopted in order to arrive at the approaches and apparatus described above. For example the pillar detaching operation can comprise any of a shaking, scraping, chemical or other operation as long as pillars are removed from the particles. The particles can have any appropriate dimension and can for example be pure silicon or doped silicon other silicon-comprising material such as a silicon-germanium mixture or any other appropriate mixture. The particles from which pillars are created may be n- or p-type, ranging from 100 to 0.001 Ohm cm, or it may be a suitable alloy of silicon, for example $Si_xGe_{1-x}$. The particles may be metallurgical grade silicon.

The particles and/or the detached pillars can be used for any appropriate purpose such as fabrication of electrodes generally including cathodes. The cathode material can be of any appropriate material, typically a lithium-based metal oxide or phosphate material such as $LiCoO_2$, $LiMn_xNi_xCO_{1-2x}O_2$ or $LiFePO_4$. The features of different embodiments can be interchanged or juxtaposed as appropriate and the method steps performed in any appropriate order.

Although relatively high purity single crystal wafers of silicon can be etched to produce pillars of the desired parameters, the wafers themselves are very expensive owing to their high purity. Furthermore, it is difficult to arrange a pillared-wafer into an electrode-geometry. Embodiments of the present invention are advantageous because metallurgical grade silicon is relatively cheap and pillared particles may themselves be incorporated into a composite electrode without further processing. Also, pillared particles are a good source of silicon fibres and can be used themselves as the "active" ingredient in a battery electrode.

The particles used for etching may be crystalline for example mono- or poly-crystalline with a crystallite size equal to or greater than the required pillar height. The poly-crystalline particle may comprise any number of crystals from example two or more.

Advantageously, metallurgical grade silicon is particularly suitable as a battery electrode because of the relatively high density of defects (compared to silicon wafers used in the semiconductor industry). This leads to a low resistance and hence high conductivity.

As the skilled person will understand, both n-type and p-type silicon can be etched and any density of charge carriers is appropriate provided the material does not become significantly degenerate.

The invention claimed is:

1. A plurality of discrete particles, wherein each particle comprises silicon, including a silicon-comprising particle core, and a plurality of silicon-comprising pillars extending outwardly therefrom from a first end to a second end, wherein each pillar in the plurality of pillars is attached to the core at the first end of the pillar, and the second end of each pillar is an unattached free end, wherein in each particle, the fraction of the surface area of the particle core occupied by the pillars is in the range of 0.10 to 0.50.

2. A plurality of discrete particles as claimed in claim 1 in which each pillar has a diameter in the range of 0.08 to 0.70 microns.

3. A plurality of discrete particles as claimed in claim 1 in which each pillar has a length from the first end to the second end in the range of 4 to 100 microns.

4. A plurality of discrete particles as claimed in claim 1 in which the pillars have an aspect ratio of greater than 20:1.

5. A plurality of discrete particles as claimed in claim 1 in which the pillars have a substantially non-circular cross-section and/or are irregular.

6. A plurality of discrete particles as claimed in claim 1 in which the particles and/or pillars comprise n-type silicon, p-type silicon, undoped silicon or a silicon germanium mixture.

7. A plurality of discrete particles as claimed in claim 1 wherein the silicon content is 90.00 to 99.95% by mass.

8. A plurality of discrete particles as claimed in claim 1 wherein the fraction of the surface area of the particle core occupied by pillars is in the range of 0.20 to 0.40.

9. A plurality of discrete particles as claimed in claim 1 in which the pillars in the plurality of pillars coat one or more surfaces of the particle.

10. A plurality of discrete particles as claimed in claim 1 wherein the particles comprise metallurgical grade silicon.

11. A plurality of discrete particles as claimed in claim 1 wherein the plurality of pillars extending outwardly from the particle core are defined in an array which is one of regular and irregular.

12. A composite electrode for a lithium-ion battery comprising a plurality of discrete particles as claimed in claim 1 and further comprising at least one of a conductive additive and a binder.

13. A battery comprising the plurality of discrete particles as claimed in claim 1.

14. A plurality of discrete particles as claimed in claim 1 wherein the plurality of particles is in the form of a powder.

15. A plurality of discrete particles as claimed in claim 1, wherein each particle consists essentially of the particle core and the plurality of silicon-comprising pillars.

16. A plurality of discrete particles as claimed in claim 1, wherein in each particle the pillars are capable of being lithiated and delithiated.

17. A plurality of discrete particles as claimed in claim 1, wherein each particle has a diameter of at least 0.5 µm.

18. A plurality of discrete particles wherein each particle comprises silicon and includes a particle core and a plurality of silicon-comprising pillars fabricated on the particle core and extending outwardly therefrom from a first end to a second end, wherein each pillar in the plurality of pillars is attached to the core at the first end of the pillar, and the second end of each pillar is an unattached free end, wherein in each particle, the fraction of the surface area of the particle core occupied by the pillars is in the range of 0.10 to 0.50.

19. A plurality of discrete particles as claimed in claim 18 wherein the particles have a first dimension in the range of 10 µm to 1 mm.

20. A composite electrode for a lithium-ion battery comprising a plurality of discrete particles as claimed in claim 18 and further comprising at least one of a conductive additive and a binder.

21. A plurality of discrete particles wherein each particle comprises silicon and includes a particle core and a plurality of silicon-comprising pillars extending outwardly therefrom from a first end to a second end, wherein each pillar in the plurality of pillars is attached to the core at the first end of the pillar, and the second end of each pillar is an unattached free end, wherein in each particle, the fraction of the surface area of the particle core occupied by the pillars is in the range of 0.10 to 0.50.

22. A plurality of discrete particles as claimed in claim 21 wherein the pillars are integral with the core.

23. A composite electrode for a lithium-ion battery comprising a plurality of discrete particles as claimed in claim 21 and further comprising at least one of a conductive additive and binder.

* * * * *